June 20, 1944.  L. P. McGOWEN  2,351,774

PLASTIC INJECTION MACHINE

Filed June 29, 1940  3 Sheets—Sheet 1

INVENTOR
L. P. McGowen
BY Edwin C. McRae
E. L. Davis
ATTORNEYS.

June 20, 1944.　　　L. P. McGOWEN　　　2,351,774
PLASTIC INJECTION MACHINE
Filed June 29, 1940　　　3 Sheets-Sheet 2

INVENTOR
L. P. McGowen
BY Edwin C. McRae
E. L. Doss
ATTORNEYS.

June 20, 1944.                L. P. McGOWEN                2,351,774
PLASTIC INJECTION MACHINE
Filed June 29, 1940                3 Sheets-Sheet 3

Patented June 20, 1944

2,351,774

UNITED STATES PATENT OFFICE 2,351,774

PLASTIC INJECTION MACHINE

Llewellyn Perry McGowen, Detroit, Mich., assignor to Ford Motor Company, Dearborn, Mich., a corporation of Delaware Application June 29, 1940, Serial No. 343,106

9 Claims. (Cl. 18—30)

The object of my invention is to provide a method of injecting plastic material by which an improved product may be produced at less cost and with less loss of material than was heretofore possible.

A further object of my invention is to provide an automatic machine for the injection of thermo-setting materials such as Makelot, Durez, Durite, Bakelite, soybean compounds, or other similar materials.

There are two processes generally used for molding plastics and there are two general classes of compounds for use with these processes. These two methods are the compression method and injection method, while the two materials are classified as thermo-setting materials and thermoplastic materials.

With the compression method powdered material is briquetted and the briquettes or preforms are placed in molds and then compressed therein and cured by heat. With the injection method the material is placed in an injection cylinder where it is heated and is then forced through a nozzle into a heated mold under a relatively high pressure. The material remaining in the nozzle is, of course, heated along with the material in the mold, so that if thermo-setting material is used the material in the nozzle, sprues, gates, etc., also cures and thus is scrap. It is for this reason that such injection machines have heretofore been used only with thermoplastic materials, as the surplus thermoplastic material may be reheated and re-used.

The conventional injection machine consisted of a die into which a nozzle was pressed, the nozzle being connected with a heating chamber having a ram associated therewith. At each cycle of the machine the ram forced powdered material into the heating chamber, the material therein being forced from the heating chamber through the nozzle into the die. The die was held closed until the material hardened and then the completed part removed so as to be ready for another cycle of the machine.

From the foregoing it will be seen that where a thermo-setting material is to be used, it has been universal practice to use the compression method. When thermo-setting materials are injected the delay caused by the curing operation, the opening and stripping of the molds, and the cleaning and reloading of the molds with inserts has caused the material in the nozzle to at least be partially cured so as to make it necessary to push out this cured stock from the nozzle before the next shot could be injected. This has limited the use of injection machines to thermoplastic material. The advantages of the injection type molding is well known to those skilled in the art, but no one heretofore, to the applicant's knowledge, has been able to adopt this type of machine for the commercial handling of thermo-setting material.

The advantages of the injection molding may be briefly stated as follows:

With the injection machine it is not necessary to maintain definite screen sizes of the materials, as is necessary to produce preforms of uniform weight.

It is further unnecessary to add stearic acid or any other material to make the powder preform as in compression molding. The difference in the average sprue weight of an injection-molded part against the average scrap flash from a compression-molded part reduces the loss of material from 20% to 6% in favor of injection molding. Furthermore, compression molding requires the employment of a steady heat not to exceed 350° F. while injection molding allows quicker curing so that it is possible to raise the heat to 450° F. or higher. This cannot be done in the compression-molding machine because the preforms become cured around the edges when laid on a mold which is at a temperature over 350° F. Still further, the strength of the part formed by injection molding is considerably greater than that of one formed by compression molding because the higher injection pressure produces a denser material. And lastly, injection molding permits shorter curing time, requires no machinery for briquetting or handling of the briquettes, continuous operation and stripping of the mold, and in general, more compact machinery.

The object of my invention is, therefore, to provide an injection-molding machine with which thermostatic material may be used and which machine will be so constructed that the material within the injection nozzle will not be cured between successive strokes of the machine.

With these and other objects in view, my invention consists in the arrangement, construction and combination of the various parts of my improved device, as described in this specification, claimed in my claims and illustrated in the accompanying drawings, in which:

Figure 5 is a plan view of one of the molds used on this machine.

Figure 2:
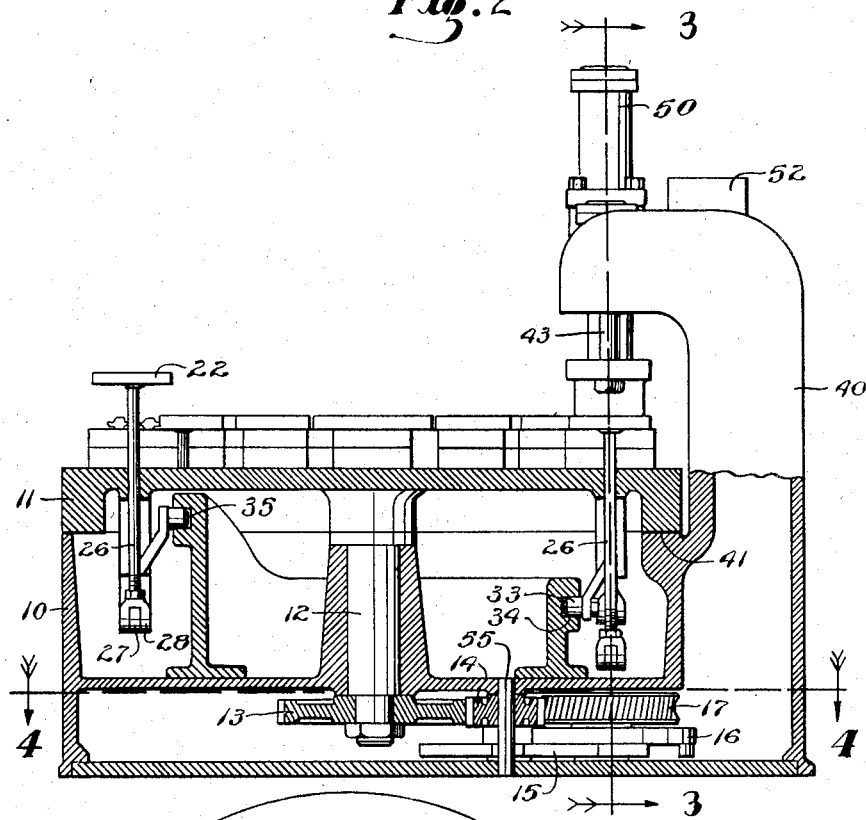
Figure 2 is a sectional view, taken upon the line 2—2 of Figure 1.
Figure 1:
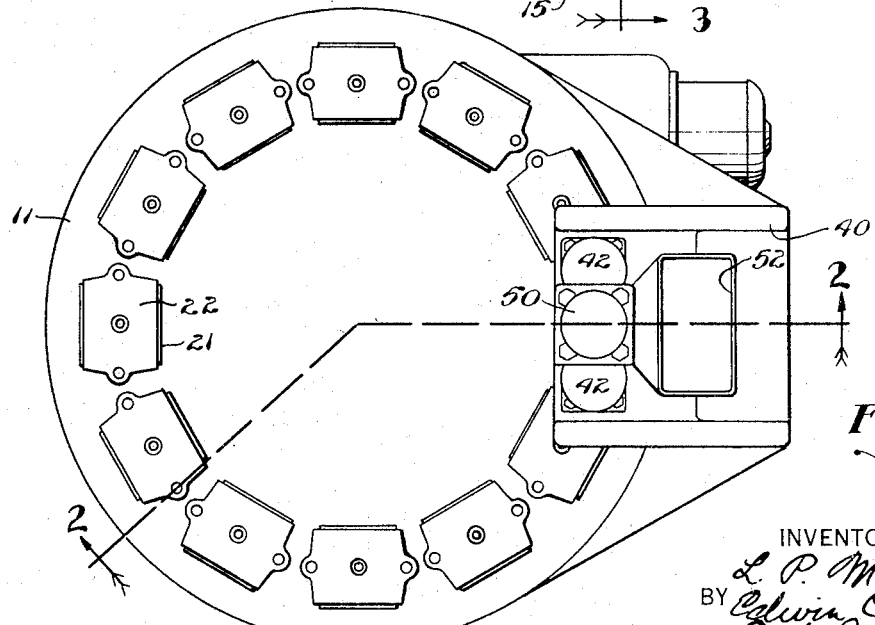
Figure 1 is a plan view of one form of my improved machine.

Before describing in detail the machine shown herein, it may be well to mention that I have provided a circular table upon which a plurality of dies are mounted, and have provided means for intermittently moving the table through an angular distance corresponding to the spacing between the dies. A toggle link clamp is fixed on each die so that when the table is rotated the dies are successively closed and then opened. A hydraulic clamping mechanism is also provided at one point around the periphery of the table and as each die in turn is conveyed beneath this clamp it is first closed and then squeezed together with hydraulic pressure and then the material is injected through a suitable opening in the die to fill the whole mold cavity therein. The hydraulic clamping mechanism is then withdrawn but the mechanical toggle clamping device is still retained on the dies to hold them together. The table is then rotated and the die that has just been filled is permitted to cure while the next die is filled in the manner just described.

In the machine shown I have provided twelve dies around the table and have provided a table-rotating mechanism such that 12 seconds elapse between each intermittent movement of the table. Thus, an interval of 144 seconds is required for any particular die to make a complete cycle. However, an interval of only 12 seconds is required for the one complete cycle of operation of the injecting plunger. For this reason the material in the die cavities has ample time to cure whereas the material in the injection nozzle, being only there for one cycle of the injection plunger, does not have time to cure and, consequently, may be injected into the next mold.

The machine shown is designed as a medium-sized machine having an eight ounce maximum shot. The machine is designed to produce 250,000 lbs. clamping pressure with 40,000 lbs. injection pressure and 10,000 lbs. curing pressure.

It will, of course, be apparent that other styles of machines may be designed for any specific class of work and that the pressure may be varied to suit the work being produced.

Referring to the drawings, I have used the reference numeral 10 to indicate a housing having a relatively large table 11 mounted thereon to rotate around a vertical shaft 12. A drive gear 13 is fixed to the lower end of the shaft 12 which gear meshes with a pinion 14. The pinion 14 is secured to a star-wheel element 15 of a Geneva motion, the pinion and star wheel being rotatably mounted upon a suitable shaft 55 within the housing 10. A driving element 16 of the Geneva motion is fixed to a worm gear 17, which gear is also rotatably mounted in the housing 10 upon a shaft 56 in position to mesh with a worm 18. The worm 18 is secured on the end of a motor shaft 19.

The gear 13 and the pinion 14 have a 3 to 1 ratio while the star wheel 15 is provided with four slots so that one revolution of the worm gear 17 rotates the gear 13 one-twelfth of a revolution.

From the foregoing it will be seen that when the motor shaft 19 is driven, the worm gear 17 will be rotated at a reduced speed which in turn will intermittently rotate the table 11 one-twelfth of a revolution for each revolution of the worm gear 17. The stationary period of the table between each movement is three times the duration of the moving period.

I have provided 12 die shoes 20 equally spaced in an annulus around the periphery of the table 11 on each of which is secured a die block 21. A die plate 22 is positioned over each block 21. Each block 21 and adjacent die plate 22 has mold cavities 24 formed therein. Each plate 22 is also provided with a nozzle receiving seat 23 which is connected to the mold cavities 24 by a relatively small passageway 25. Thus, material will be conducted by the passageway 25 to the cavities 24.

A pair of clamping rods 26 extend from each plate 22 downwardly through the table 11, the lower ends being connected by a beam 27. The upper ends of these tension rods are provided with suitable heads so that they may pull the die plates 22 downwardly. The bottom ends of these rods are threaded into suitable eye members 28 which are pivotally connected to the beams 27.

It will be noted that trunnions 29 are formed on the underside of the table 11 between each pair of rods 26 and that a pair of toggle links 30 and 31, respectively, extend between each trunnion 29 and the center of the adjacent beam 27. The upper toggle link 31 is provided with an arm 32 formed integrally therewith which extends to one side of the toggle center line and which is provided with a suitable roller 33 which operates in a cam groove 34 machined around the inside of the housing 10. When the toggle links 30 and 31 are in the positions, shown in Figure 3, the adjacent beam 27 will be forced downwardly thereby tensioning the rods 26 to clamp the die plate 22 against the die block 21. The rods are so adjusted that a clamping pressure of about 10,000 lbs. will be exerted when the toggle links are aligned to hold these dies closed.

The cam groove 34 is so shaped that when the table 11 rotates, the rollers 33 will ride upon an elevated portion 35 for one-quarter of a revolution. In this position the links 31 will be moved counterclockwise to thereby raise the beam 27 upwardly thus opening the dies. The elevated portion is shown as the open position in Figure 2.

A plurality of knockout bars 36 extend downwardly through each die block 21 into a suitable recess in the adjacent shoe 20 and are connected to an operating disc 37 which in turn is actuated by a plunger 38. The plunger 38 extends downwardly through the adjacent portion of the die shoe 20 and table 11. The lower end of the plunger 38 is positioned directly above the pivot point of the toggle link 31. A cam 39 is formed on the arm 32 just beneath the plunger 38 and is of such contour that when the toggle links are in the position shown, the cam 39 will be spaced beneath the end of the plunger 38. However, when the toggle links are retracted then the cam 39 will coact with the lower end of the plunger 38 to raise the disc 37 thus pushing the bars 36 upwardly to thereby remove the molded part which has been formed in the die.

These knockout bars are also used for supporting inserts where required in the molds. The inserts are inserted into openings in the ends of these knockout bars and so that when the dies close the inserts are drawn downwardly to their desired positions within the molds.

The portion of the machine just described may be varied in many respects to accommodate different numbers of molds or different sizes and shapes of molds, the only indispensable feature being that a plurality of molds are used and that the molds be successively moved under the injection head.

The head portion of my machine is built around a frame 40 which extends upwardly from the housing 10 on one side of the table 11. The upper end of the frame 40 extends inwardly over the edge of the table. Means are provided on the frame 40 for securing hydraulic clamping cylinders and an injecting cylinder to this portion of the frame. It will also be noted that a rest 41 is cast integrally with the frame 40 just beneath the adjacent portion of the table 11 so that when the hydraulic pressure is applied, the adjacent edge of the table 11 will be supported independently of the shaft 12. The shaft 12 is thus relieved of bending stresses. Inasmuch as a pressure of around 125 tons is applied upon each die, the inadequacy of supporting the dies solely by the table 11 will be more apparent.

Figure 3:
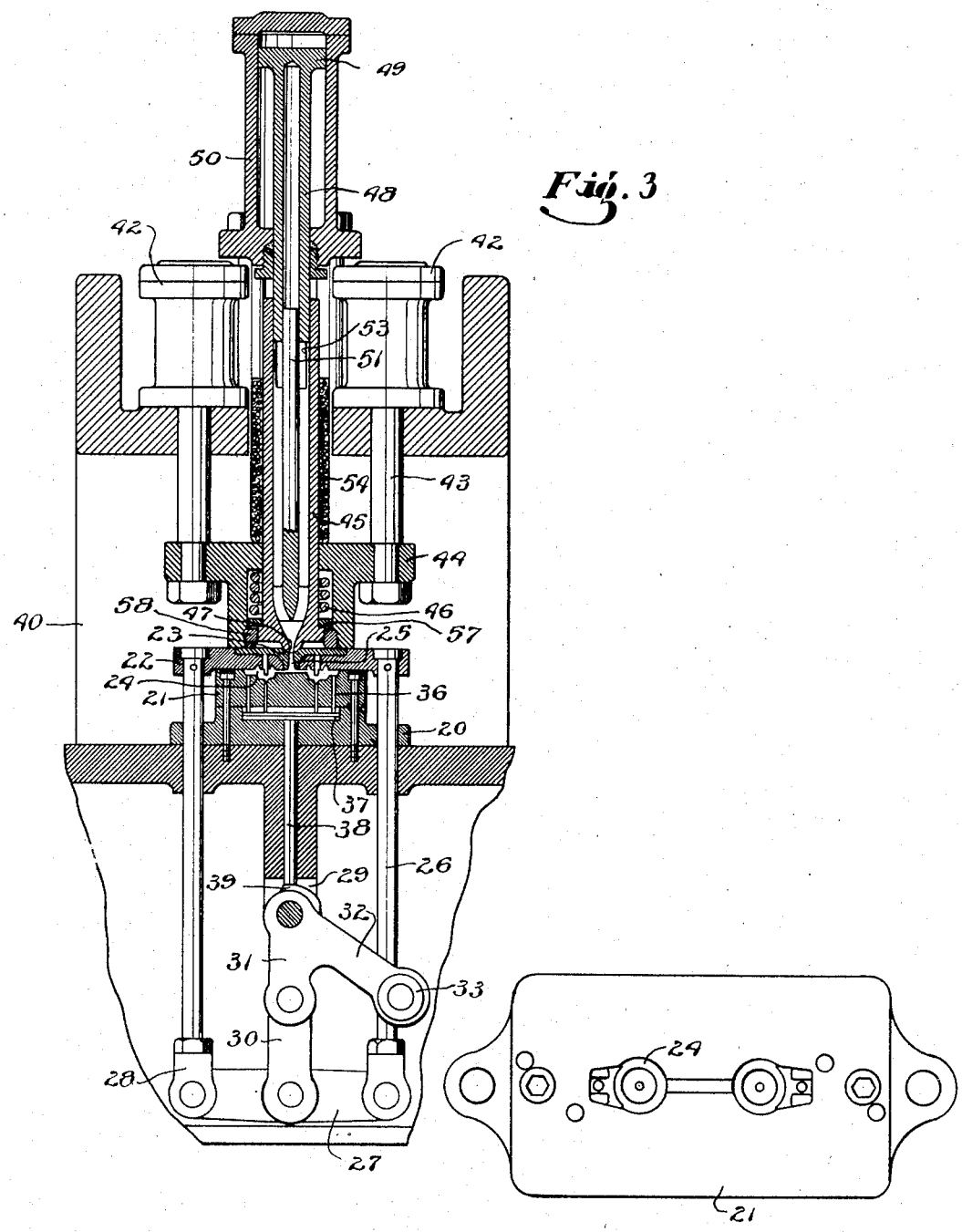
Figure 3 is a sectional view, taken upon the line 3—3 of Figure 2.

Referring to Figure 3, I have provided a pair of clamping cylinders 42 which cylinders are attached to the overhanging portion of the frame 40. Piston rods 43 extend from the cylinders 42 downwardly where they are secured to a pressure plate 44. Suitable valves and conduits, not shown in the drawings, are provided to simultaneously reciprocate the piston rods 43 and the pressure plate 44. When fluid pressure is applied to the cylinders 42, the pressure plate 44 is moved downwardly against the upper face of the die plate 22 to thereby clamp this plate firmly against the die block 21. In the size of the machine shown, the fluid applied to the cylinders 42 is under such pressure that a pressure of about 125 tons is applied to hold the dies closed.

The pressure plate 44 is provided with a central bore therein in which an injection cylinder 45 is reciprocally mounted so as to extend upwardly between the two cylinders 42. The lower end of the cylinder 45 is provided with a shoulder 57 and a compression spring 46 resiliently urges the injection cylinder 45 downwardly in the plate 44 against a stop nut 58. The lower end of the injection cylinder 45 is provided with a nozzle 47 which is adapted to coact with each seat 23.

A tubular injection ram 48 is reciprocally mounted within the cylinder 45, the upper end of which is formed integrally with a piston 49 which is reciprocally mounted in a power cylinder 50. Fluid applied between the piston 49 and the upper end of the cylinder 50 forces the ram 48 downwardly into the injection cylinder 45 to thereby force material which may be within this cylinder outwardly through the nozzle 47.

The cylinder 45 is provided with a solid core 51 so that the plastic material being forced downwardly through the injection cylinder is in the form of a relatively thin walled tube. Powdered plastic material is a relatively poor conductor of heat and, as it must be heated in the injection cylinder 45, this may better be accomplished when its cross section is comparatively thin.

A material hopper 52 is mounted upon the frame member 40 and is connected by means of a suitable conduit with a port 53 in the upper portion of the injection cylinder 45, so that when the ram 48 is in its uppermost position material will flow from the hopper 52 downwardly through this port into the cylinder 45. When the ram 48 is forced downwardly the port 53 is covered by the ram so that the material cannot escape. An induction heating coil 54 is installed around the outside of the cylinder 45 and heats the cylinder 45 and core 51 by high frequency induction. This of course heats the material within the cylinder by conduction.

Figure 6:
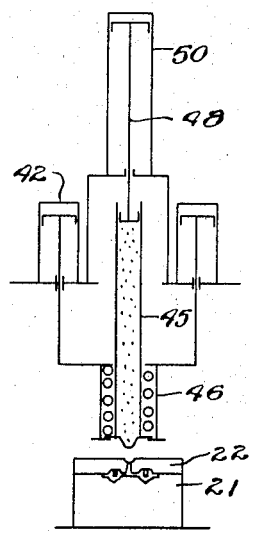
Figures 6, 7, 8 and 9 are diagrammatic views, illustrating successive steps in the die clamping and injection portion of the cycle used in this machine.
Figure 7:
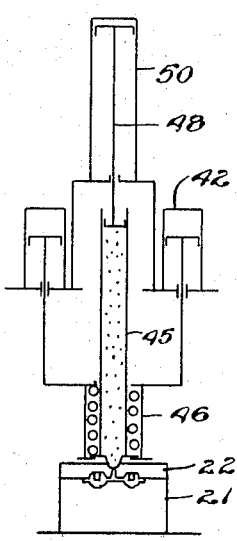
Figure 8:
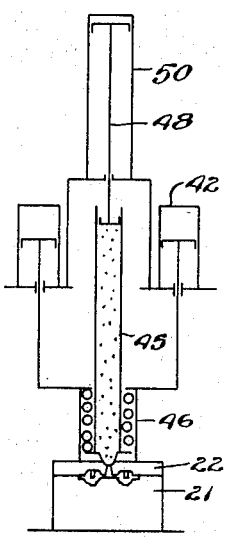
Figure 9:
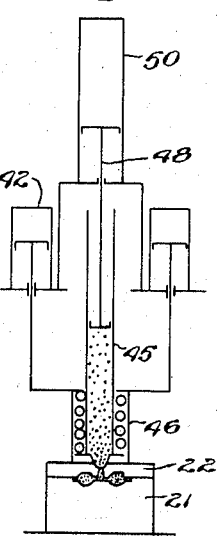
Figure 4:
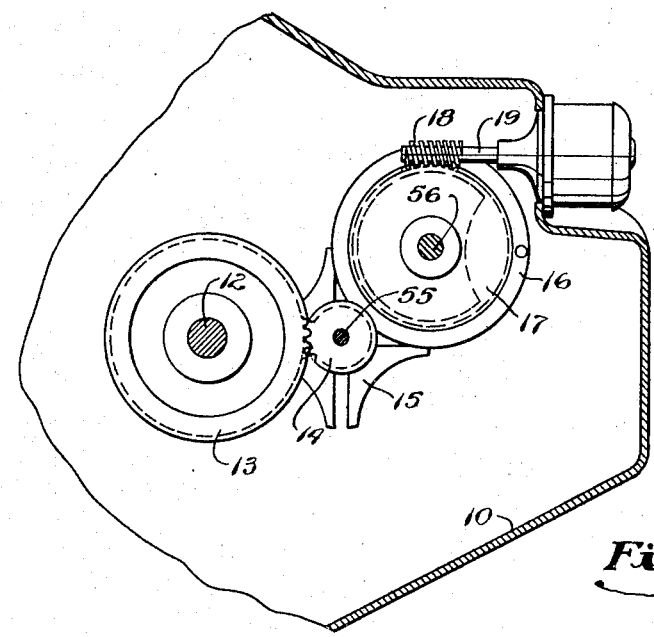
Figure 4 is a sectional view, taken upon the line 4—4 of Figure 2.

Referring to Figures 6 through 9, the sequence of operation for each cycle of the injection cylinder is shown as each individual die is moved by the table 11 to a position beneath the injection cylinder. The die plate 22 is clamped against its die block by the toggle link construction previously described; the dies are thus closed before being moved beneath the injection cylinder. This is shown in Figure 6. Fluid under pressure is then fed to the upper ends of the cylinders 42 and forces the pressure plate 44 and injection cylinder 45 downwardly to the position shown in Figure 7. At this time the nozzle 47 enters the seat 23, but the plate 44 has not yet pressed against the die block. Further movement of the pressure plate 44 causes plate 44 to engage the upper face of the die plate 22. This is permitted by compression of the spring 46. The spring 46 when compressed resiliently urges the nozzle 47 against the seat 23 but the main force delivered by the pressure plate 44 is resisted by the upper face of the die to hold the dies together. The spring 46 is of sufficient size that the nozzle 47 is firmly, even though resiliently, held into the seat 23.

With the pressure still applied to the cylinders 42, pressure is then applied to the piston 49 which moves the ram 48 downwardly thus forcing a charge of material through the nozzle 47 into the passageway 25 from which it is forced into the mold cavities 24. The pressure is held a few seconds on the material and is then released from the piston 49 and pressure is applied beneath the piston to raise the ram 48 upwardly. Pressure is then applied to the lower ends of the cylinders 42 to raise the pressure plate 44 upwardly. Movement of this plate need only be comparatively little or just enough so that the die may be moved laterally by rotation of the table from beneath the injection cylinder.

After each die is filled it is intermittently moved one-twelfth of a revolution on the table 11 but the dies are still held together by the toggle links 30 and 31 for about six or seven stations beyond the injection cylinder. After the table is moved about one-half of a revolution each roller 33 engages the elevated portion 35 of the cam track and thereby collapses the toggle links 30 and 31 thus raising the plate 22 upwardly so as to open the die cavities. The knockout bars 36 are also pushed upwardly to thereby remove the molded part.

With those parts in which inserts are required it is advisable to have the cam track 34 designed to hold the dies open for from three to four stations to give the operator time to remove the molded parts, clean the dies and install the necessary inserts.

Among the many advantages arising from the use of my improved machine it may be well to mention that thermo-setting material requiring from one to one-and-one-half minutes for curing may be molded and still the material within the injection nozzle will not be even partially cured. Only 10 or 12 seconds occurs between cycles of the injection cylinder to thereby prevent the setting up of material within the nozzle. This eliminates the need of cleaning the nozzle between each injection stroke as has heretofore been required where thermo-setting material was tried in an injection type of machine.

A further advantage of my improved machine is the pressure applied to the injection nozzle and the material is applied in a direction tending to force the die plates together. The clamping pressure is thus the sum of the pressures delivered by the cylinders 42 and 50. Where the injection nozzle is inserted at right angles between the die halves, the pressure applied to the nozzle tends to spread the dies apart so that a much higher pressure must be exerted by the pressure plate to overcome this injection pressure.

Some changes may be made in the arrangement, construction and combination of the various parts of my improved device without departing from the spirit of my invention and it is my intention to cover by my claims such changes as may reasonably be included within the scope thereof.

I claim as my invention:

1. A device of the character described, comprising, a housing, a conveyor mounted upon said housing, a plurality of molds mounted on said conveyor, a plastic injecting device having a nozzle mounted upon said housing, said injecting device comprising pressure and heating means, cyclic means for operating said conveyor to successively move each of said molds into position adjacent to said injecting device and for urging said nozzle into engagement with and to force plastic composition therethrough into each mold as it moves into position adjacent thereto, resilient means effective between said nozzle and other portions of said plastic injecting device urging said nozzle toward said conveyor, and means for exerting a continuous pressure upon the plastic so injected into each of said molds for several cycles of said cyclic means after said injection.

2. A device of the character described, comprising, a housing, a table rotatably mounted upon said housing, a plurality of two-part molds mounted in an annulus upon said table, a plastic injecting device including a nozzle mounted upon said housing, means for intermittently rotating said table to successively move each of said molds into position adjacent said injecting device and for holding said molds stationary between each of said intermittent movements, means for moving said nozzle into contact with each mold when adjacent said injecting means and for forcing plastic through said nozzle into said mold when in contact, means for holding each of said molds closed under a relatively high pressure during said injection period including resilient means interposed between said nozzle and other portions of said injection device normally urging said nozzle toward said table, and means for holding each of said molds closed under a lesser pressure for several cycles of said intermittent rotating means.

3. A molding machine comprising, a housing, a table rotatably mounted upon said housing, a plurality of molds comprising an upper and a lower part mounted upon said table, the lower parts thereof being fixed on said table, a toggle link associated with each of said molds which links coact with said housing as the table rotates to hold said molds closed during a portion of one revolution of said table and which links are collapsed during the remaining portion of said revolution, a plastic injection cylinder mounted above said table, a nozzle associated with said cylinder which successively coacts with seats in the upper part of said molds, means for intermittently rotating said table through an angular distance equal to the spacing between said molds, and means for forcing said nozzle into said seat and for extruding plastic material from said nozzle into said molds.

4. A molding machine comprising, a housing, a table rotatably mounted upon said housing, a plurality of two part molds mounted upon said table, the lower parts thereof fixed on said table, a toggle link associated with the upper part of each mold, which toggle links coact with said housing upon the rotation of said table to hold said molds closed under a substantial pressure during a portion of the revolution of said table and to hold said mold open during the remaining portion of said table revolutions, a plastic injecting cylinder reciprocably mounted in position above said molds, means for successively filling by extrusion each mold from said cylinder as it passes therebeneath, means for forcing said cylinder into engagement with the upper part of each said mold imposing pressure thereon, means for intermittently rotating said table an angular distance equal to the space between said molds during one complete cycle of said injecting cylinder.

5. A method of continuous injection of thermo-setting plastic materials, said materials being characterized by the property of curing when maintained at the injection temperature for a sufficient period, which comprises the steps of charging a container with said material, heating said charge of material to the injection temperature therein, forcing sufficient of said heated material from said container into one of a series of molds, and repeating said steps in sequence at time intervals substantially less than that required for the curing of said material.

6. A method of continuous injection of thermo-setting plastic materials into molds, said materials being characterized by the property of curing when maintained at the injection temperature for a sufficient period, which comprises the steps of charging a container with said material, the container being of size adequate to hold an excess of material to fill one such mold but insufficient to fill two such molds, heating said charge of material to the injection temperature therein, forcing a portion of said heated material from said container into one of a series of molds, and repeating said steps in sequence at time intervals substantially less than half of that required for the curing of said material.

7. A method of continuous injection of thermo-setting plastic materials to form molded articles therefrom, said materials being characterized by the property of curing when maintained at the injection temperature for a sufficient period, which comprises the steps of charging a container with said material, heating said material therein to the injection temperature, forcing sufficient of said heated material from said container into one of a series of molds, and repeating said steps in sequence of said container with respect to each of said molds, the time interval between successive sequences being such that none of said material remains in said container long enough to be cured therein.

8. A molding machine comprising, a housing, a table rotatably mounted on said housing, a plurality of molds mounted upon said table, holding means associated with each mold, said holding means coacting with the housing upon the rotation of said table to hold said mold closed under a substantial pressure during a portion of the revolution of said table and to hold said mold open during the remaining portion of said table revolution, a plastic injection cylinder mounted in said housing for reciprocable movement with respect to said table, a second holding means associated with said injecting cylinder and movable therewith, said second holding means in its extended position exerting pressure on the mold thereunder to hold said mold parts together and engaging said plastic injection cylinder resiliently with said mold.

9. In a molding machine comprising, a housing, a table rotatably mounted on said housing, a plurality of multi-part molds mounted upon said table, the lowermost of said parts secured above said table, toggle holding means disposed beneath said table and associated with the uppermost of said parts, said holding means coacting with said housing upon the rotation of said table to hold said molds closed under substantial pressure during a portion of the revolution of said table and to hold said molds open during the remaining portion of said table revolution, a plastic-injection cylinder reciprocably mounted in position on said housing above said molds, hydraulic means associated with said injecting cylinder to extrude plastic material therefrom, hydraulic means to force said cylinder downwardly exerting pressure on the uppermost mold part, said second hydraulic means holding mold parts together and engaging said plastic-injection cylinder resiliently with said molds, and means to rotate said table intermittently to locate said molds successively at said plastic-injection cylinder.

LLEWELLYN PERRY McGOWEN.